United States Patent [19]
Weyer

[11] Patent Number: 4,513,644
[45] Date of Patent: Apr. 30, 1985

[54] FLUID POWERED TORQUE WRENCH

[76] Inventor: Paul P. Weyer, 48811 - 284th Avenue S.E., Enumclaw, Wash. 98022

[21] Appl. No.: 566,320

[22] Filed: Dec. 28, 1983

[51] Int. Cl.$^3$ .............................................. B25B 13/48
[52] U.S. Cl. .................................................. 81/57.39
[58] Field of Search ............................ 81/57.39, 57.44

[56] References Cited

U.S. PATENT DOCUMENTS

| | | | |
|---|---|---|---|
| 2,702,489 | 2/1955 | Wallace . | |
| 2,740,508 | 4/1956 | Shaff . | |
| 2,808,749 | 10/1957 | Lampke . | |
| 2,895,359 | 7/1959 | Nelson | 81/57.39 |
| 2,952,176 | 9/1960 | Mitchel . | |
| 3,602,072 | 8/1971 | Sensat | 81/57.39 |
| 3,733,935 | 5/1973 | Tsuji . | |
| 3,866,493 | 2/1975 | Ringerud . | |
| 3,939,924 | 2/1976 | Grabovac . | |
| 4,116,093 | 9/1978 | DePagter . | |
| 4,141,261 | 2/1979 | Tummel . | |
| 4,346,630 | 8/1982 | Hanson . | |

FOREIGN PATENT DOCUMENTS

| | | | |
|---|---|---|---|
| 324992 | 9/1920 | Fed. Rep. of Germany | 81/57.44 |

*Primary Examiner*—James L. Jones, Jr.
*Attorney, Agent, or Firm*—Seed and Berry

[57] ABSTRACT

A fluid-powered torque wrench connectible to external fluid lines including an elongated cylindrical body having ports for introducing pressurized fluid therein; an output shaft rotatably disposed within the body and having a drive end for securing a socket thereto for engaging and driving a nut by rotation of the shaft; linear-to-rotary transmission means disposed within the body and operable to provide relative rotational movement between the shaft and the body, the transmission means including a piston for application of fluid pressure to one or another side thereof to produce linear movement of the piston within the body, and means for translating linear movement of the piston into relative rotational movement between the shaft and the body; an elongated lever arm having a head end portion for rotatably supporting and selectively engaging the body, and a handle end portion for holding the lever arm stationary; a ratchet operative between the lever arm and the body for preventing rotational movement of said body relative to the lever arm in a first rotational direction and permitting rotational movement of the body relative to the lever arm in the second rotational direction; and a stem axially aligned with the body and projecting from the exterior of the body through an end cap thereof and through the piston, the stem being rotatably received by the end cap and the piston, and slidably engaging the piston, the stem extending sufficiently into the body to engage the piston during the entire travel of the piston within the body, and having a pair of interiorly disposed conduits, the one conduit communicating fluid between one of the external fluid lines and one side of the piston, and the other conduit communicating fluid between another of the external fluid lines and the other side of the piston, the stem being in fluid-sealed relation with the end cap and the piston.

11 Claims, 4 Drawing Figures

FLUID POWERED TORQUE WRENCH

DESCRIPTION

1. Technical Field

The present invention relates generally to torque wrenches and, more particularly, to fluid powered torque wrenches which produce an output torque exceeding that a man can apply manually.

2. Background Art

It is sometimes necessary to apply a predetermined torque to fasteners which is in excess of that which a man can apply with a conventional torque wrench without power assistance. For example, if a nut on a large oil pipe flange requires a 10,000-foot-pound final torque, it is virtually impossible for a man to apply such a torque manually.

One known power-assisted torque wrench utilizes a hydraulic cylinder pivotally mounted by its case to a stationary plate and pivotally attached by its extendible arm to a free end of a rotatable socket-carrying lever. With the plate fixedly attached to the device having the nut to be torqued, and the socket positioned over the nut, the lever arm and the extensible arm are initially positioned at substantially a right angle. As hydraulic pressure is applied to the cylinder, the extensible arm is extended to turn the lever and torque down the nut. While this arrangement provides the necessary amount of power assistance, the rotational travel of the lever arm and hence the socket during one stroke of the hydraulic cylinder is limited, and the application of force is inefficient and inaccurate. The inefficiency arises from the fact that once the extensible arm moves the lever arm out of their original orthogonol relationship, part of the force applied by the extensible arm produces a force vector tending to pull the socket radially away from the nut without producing rotation of the socket. Since metered fluid pressure is utilized to determine the torque applied by the wrench, and since it is difficult and time consuming to take the necessary measurements and do the necessary calculations to determine the ever-varying torque being applied as a result of the nonrotational force vector which is different at each point along the path of the lever arm travel, inaccuracies arise. Another disadvantage of such conventional torque wrenches is their use of a hydraulic cylinder which inherently produces less torque than required by many circumstances.

It will therefore be appreciated that there has been a significant need for a fluid powered torque wrench with the ability to provide precise torque beyond the torque that a man is capable of providing manually. The torque wrench should be relatively light in weight, durable in construction, and relatively inexpensive. The present invention fulfills this need and further provides other related advantages.

DISCLOSURE OF INVENTION

The present invention resides in a fluid powered torque wrench. The torque wrench has an elongated cylindrical body with ports for introducing pressurized fluid therein; an output shaft rotatably disposed within the body and having a drive end for securing a socket or other tool thereto for engaging and driving a nut, screw or the like by rotation of the shaft; linear-to-rotary transmission means disposed within the body and operable to provide relative rotational movement between the shaft and the body; an elongated lever arm having a head end portion for rotatably supporting and selectively engaging the body, and a handle end portion for holding the lever arm stationary; and a directional control operative between the lever arm and the body for preventing rotational movement of the body relative to the lever arm in a first rotational direction and permitting rotational movement of the body relative to the lever arm in a second rotational direction.

The transmission means includes a piston for application of fluid pressure to one or another side thereof to produce linear movement of the piston within the body, and means for translating linear movement of the piston into relative rotational movement between the shaft and the body.

The application of fluid to the one side of the piston rotates the shaft to drive the nut, screw or the like, and urges the body to rotate in the first rotational direction under the rotational counterforce which occurs, and the application of fluid to the other side of the piston with the shaft held substantially stationary urges the body to rotate in the opposite second rotational direction under the rotational counterforce which occurs. The directional control converts the relative rotational movement between the shaft and the body resulting from the application of fluid pressure to the one side of the piston into rotation of the shaft relative to the lever arm for driving the nut, screw or the like by preventing rotation of the body in the first rotational direction. The directional control converts the relative rotational movement between the shaft and the body resulting from the application of fluid pressure to the other side of the piston into rotation of the body relative to the lever arm for repositioning the piston within the body for another driving stroke of the piston by permitting rotation of the body in the second rotational direction when the shaft is held substantially stationary.

The torque wrench includes a stem axially aligned with the body and projecting from the exterior of the body through an end cap thereof and through a head of the piston. The stem is rotatably received by the end cap and by the head, and slideably engages the head. The stem extends sufficiently into the body to engage the head during the entire travel of the head within the body, and has a pair of interiorly disposed conduits. One conduit communicates fluid between one of a pair of external fluid lines and the one side of the head, and the other conduit communicates fluid between another of the pair of external fluid lines and the other side of the head. The stem is in fluid-sealed relation with the end cap and the head. The stem permits the connection of relatively stationary external fluid lines to the body to provide fluid under pressure to the interior of the body while permitting free rotation of the body during operation of the wrench. The external fluid lines are provided with quick-release couplings for detachably securing them to the stem.

In accordance with another feature of the invention, the handle end portion of the lever arm has a longitudinally extending slot sized to receive therein a stationary object for holding the lever arm stationary during operation of the wrench. The drive end of the shaft extends transversely to the lever arm and therebeyond, and is adapted for the detachable securing of a socket or other tool thereto.

The directional control includes means for selectively reversing its operation to permit rotational movement of the body relative to the lever arm in the first rotational direction, and to prevent rotational movement of the body relative to the lever arm in the second rotational direction, whereby the output shaft may be selectively rotated clockwise or counterclockwise to drive the nut, screw or the like for tightening or loosening. In one embodiment of the invention, the body has an externally toothed portion extending circumferentially thereabout, and the head end portion of the lever arm extends about the toothed body portion. The directional control also includes a ratchet pawl having an arcuate, elongated tooth face resiliently biased toward the body to place the pawl in engagement with the toothed body portion. The pawl has an enlarged opening for loosely receiving therein an off-center member selectively movable to either side of a radial center line. With the pawl in its one position, the member reversibly prevents lateral movement of the pawl in one direction to allow rotational movement of the body relative to the lever arm in the second rotational direction, while permitting lateral movement of the pawl in an opposite direction to bring the pawl into wedging engagement with the lever arm to lock the toothed face of the pawl against the toothed body portion and prevent rotational movement of the body relative to the lever arm in the first rotational direction.

Other features and advantages of the invention will become apparent from the following detailed description, taken in conjunction with the accompanying drawings.

BEST MODE FOR CARRYING OUT THE INVENTION

Figure 1:
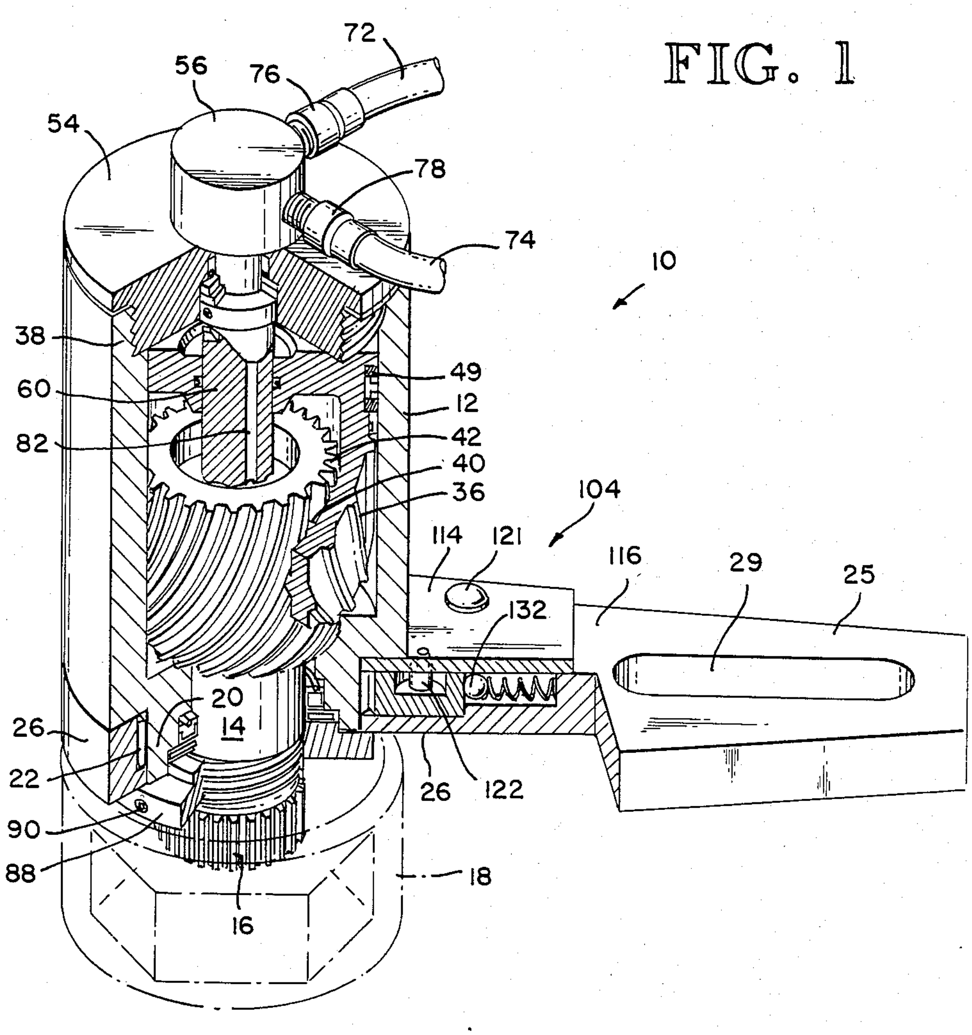
FIG. 1 is a fragmentary, sectional isometric view of a fluid-powered torque wrench embodying the present invention.

As shown in the drawings for purposes of illustration, the present invention is embodied in a fluid-powered torque wrench, indicated generally by reference numeral 10. The wrench 10 includes an outer, elongated cylindrical body 12, an output shaft 14 rotatably disposed within the body and having a drive end 16 for detachably securing a socket 18 or other tool thereto for engaging and driving a nut, screw or the like (not shown) by rotation of the shaft. The body 12 has a reduced diameter end portion 20, with external gear teeth 22 extending circumferentially about the end portion. The wrench 10 also includes an elongated lever arm 24 with a handle end portion 25 for holding the lever arm stationary, and a head end portion 26 having an aperture 27 therethrough for rotatably receiving and supporting the reduced diameter end portion 20 of the body 12. The drive end 16 of the shaft 14 extends beyond the head end portion 26 of the lever arm 24 and transversely thereto. The handle end portion 26 has a longitudinally oriented slot 29 sized to receive therein a stationary item, such as a bolt shaft or head located near the nut, screw or the like being driven by the wrench 10, for holding the lever arm 24 stationary during powered operation of the wrench.

Figure 2:
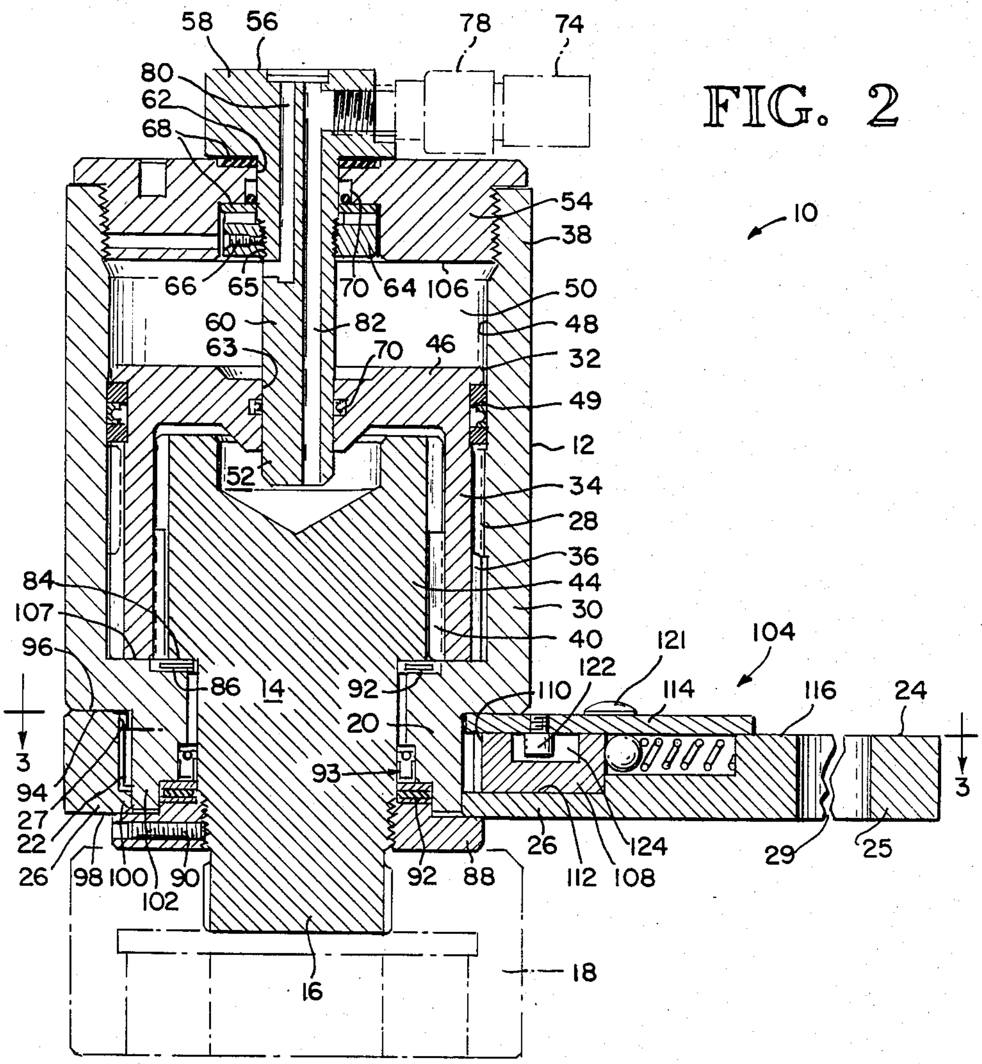
FIG. 2 is an enlarged fragmentary, sectional side elevational view of the wrench shown in FIG. 1.

Disposed within the body 12 is a linear-to-rotary transmission means operable to provide relatively rotational movement between the body 12 and the shaft 14. The transmission means includes inner helical splines 28 integrally formed over the interior wall of a midportion 30 of the body 12, and a piston 32 having a piston sleeve 34 with outer helical splines 36 over a portion of its length which mesh with the inner helical splines of the body. the piston 32 is slidably retained within the body 12 for reciprocation therein in an axial direction between a first end position toward a first end 38 of the body 12 remote from the reduced diameter end portion 20 of the body, and a second end position toward the reduced diameter end portion of the body, the latter position of the piston being shown in FIG. 2. The sleeve 34 is also provided with inner helical splines 40 which mesh with outer helical splines 42 provided on a splined end portion 44 of the output shaft 14 remote from the drive end 16 of the shaft. The piston 32 also has a piston head 46 integrally formed with the sleeve 34 and positioned for linear travel with a smooth bore portion 48 of the body 12 between the splined midpotion 30 and the first end 38 of the body. A ring seal 49 disposed between the piston head 46 and the smooth bore portion 48 of the body 12 prevents fluid leaks past the piston head. It should be understood that while helical splines are shown in the drawings and described herein, the principle of the invention is equally applicable to any form of linear-to-rotary motion conversion means.

As will be readily understood, reciprocation of the piston 32 occurs when hydraulic fluid or air under pressure is applied to a fluid-tight chamber 50 to a side of the piston head 46 toward the first end 38 and above the head, or to a fluid-tight chamber 52 to an opposite side of the piston head toward the reduced diameter end portion 20 of the body 12 and below the head. As the piston 32 linearly reciprocates in an axial direction within the body 12, the outer helical splines 36 of the sleeve 34 engage or mesh with the inner helical splines 23 of the body to case rotation of the piston. The linear and rotational movement of the piston 32 is transmitted through the inner helical splines 40 of the sleeve 34 to the outer helical splines 42 of the output shaft 14 to cause the shaft to rotate. As will be described below, the longitudinal movement of the shaft 14 is restricted, thereby converting all movement of the piston 32 to relative rotational movement between the body 12 and the shaft. Depending on the slope and direction of turn of the various helical splines, there may be provided a multiplication or reduction of the relative rotation between the body 12 and the output shaft 14. In a presently preferred embodiment, using fluid pressure of 10,000 p.s.i., torques of 10,000 foot-pounds have been achieved.

The first end 38 of the body 12 is closed with a threaded first end cap 54. A fluid line connector 56 with an enlarged head portion 58, positioned exterior of the body 12, has a cylindrical stem portion 60 which projects through an opening 62 in the first end cap 54 and through an opening 63 in the piston head 46. The stem 60 is axially aligned with the body 12 and rotatably received by the first end cap 54 and the piston head 46 to permit the free rotation of the body relative to the stem as the body and piston head 46 rotate during operation of the wrench 10. The stem 60 slidably engages the piston head 46 to permit the free linear movement of the piston 32 during the length of its entire axial travel within the body. The fluid line connector 56 is maintained in a fixed longitudinal position relative to the body 12 by a interiorly threaded ring 64 which is threadably fixed to an exteriorly threaded midportion 65 of the stem 60 inward of the first end cap 54. The ring 64 is secured in place for rotation with the stem 60 by a lock screw 66. Antifriction bearings 68 are disposed between the head portion 58 of the fluid line connector 56 and the outward face of the first end cap 54, and between the inward face of the first end cap and the ring 64. Seals 70 are disposed between the first end cap 54 and the stem 60, and between the piston head 46 and the stem to prevent fluid leaks.

A pair of external fluid lines 72, 74 are detachably secured to the head portion 58 of the fluid line connector 56 by quick-release couplings 76, 78, respectively. The stem 60 of the fluid line connector 56 has a pair of interiorly disposed conduits 80, 82 which communicate fluid between the external fluid lines 72, 74 and the chambers 50, 52, respectively.

Longitudinal movement of the shaft 14 within the body 12 is prevented by a stop shoulder 84 of the shaft engaging an interior radial wall 86 of the body 12, and by an enlarged threaded ring 88 threadedly attached to the shaft 14 external of the body at its reduced diameter end portion 20. The ring 88 is secured to the shaft 14 for rotation therewith by a lock screw 90. Antifriction bearings 92 are disposed between the stop shoulder 84 and the radial wall 86, and between the body 12 and the ring 88. A seal 93 is disposed between the shaft 14 and the reduced diameter end portion 20 to prevent fluid leaks.

The body 12 has an exterior radial wall 94 extending between the full width of the body 12 and its reduced diameter end portion 20, which slidably engages an upward face 96 of the head end portion 26 of the lever arm 24 to support the body. The ring 88, in addition to maintaining the longitudinal position of the shaft 14 relative to the body 12, also extends radially outward a sufficient distance to engage a downward face 98 of the head end portion 26 of the lever arm 24. The ring 88 thereby maintains the positioning of the head end portion 26 relative to the reduced diameter end of portion 20 of the body 12. The radial position of the reduced diameter end portion 26 within the aperture 27 extending through the head portion 26 of the lever arm 24 is maintained by an inwardly projecting circumferential wall 100 which slidably engages a smooth-walled portion of the reduced diameter end portion adjacent to the external gear teeth 22.

Mounted to the head end portion 26 of the lever arm 24 and operative between the head portion and the external gear teeth 22 of the body 12 is a ratchet mechanism, indicated generally by reference numeral 14. The ratchet mechanism 104 selectively prevents rotational movement of the body 12 relative to the lever arm 24 in one rotational direction, while permitting rotational movement of the body relative to the lever arm in an opposite rotational direction.

In operation, the ratchet mechanism 104 converts the relative rotational movement between the shaft 14 and the body 12, resulting from the application of fluid pressure to the chamber 50 above the piston head 46, into rotation of the shaft relative to the lever arm 24 for driving the nut, screw or the like to which the socket 18 is attached by preventing rotation of the body under the urgings of the rotational counterforce caused by the driving action. When the piston 32 has completed its downward stroke, by reaching its downward limit of travel, the rotation of the output shaft 14 ceases and the piston must be repositioned within the body for another driving stroke. This is accomplished by the application of fluid pressure to the chamber 52 below the piston head 46, which reverses the direction of the relative rotation between the body 12 and the shaft 14. With the socket 18 still connected to the partially tightened nut, screw or the like being torqued, the shaft 14 is thereby held substantially stationary and the application of fluid pressure to the chamber 52 returns the piston 32 to its upward limit of travel. As the piston 32 travels upward, the ratchet mechanism 104 permits rotation of the body 12 in the second rotational direction relative to the lever arm.

It is to be understood that while in the presently preferred embodiment of the invention the shaft 14 is held stationary during the repositioning of the piston 32 by maintaining the socket 18 on the partially tightened nut, the lever arm 24 may be provided with a selectively operable stop means to hold the shaft stationary relative to the lever arm during repositioning of the piston to its upward limit of travel.

Torque may be applied to a nut during the downward stroke of the piston 32, with the amount of torque being applied directly proportional to the fluid pressure utilized, as measured by a pressure gauge (not shown). A conventional relief valve (not shown) may be used to limit pressure build-up beyond a level much greater than is necessary to achieve the torque required. The torque applied is independent of the position of the piston 32 within the body 12 and is constant over the full rotation of the nut resulting from the downward stroke of the piston 32. When the piston 32 reaches its downward limit of travel, the pressure reading on the pressure gauge will immediately and drastically increase, indicating completion of the full stroke, and signal the operator to switch the fluid pressure to the chamber 52 below the piston head 46 to reposition the piston 32 to its upward limit of travel in preparation for another stroke. The upward limit of piston travel is defined by the piston head 46 engaging and inward face 106 of the first end cap 54, and the downward limit of piston travel is defined by the piston sleeve 34 engaging an interior radial wall 107 toward the reduced diameter end portion 20 of the body 12.

The ratchet mechanism 104 of the presently preferred embodiment includes a generally semicircular engagement member 108 with an enlongated, arcuate toothed face 110 in juxtaposition to the teeth 22 of the reduced end portion 20 of the body 12 for engagement therewith. The engagement member 108 operates as a ratchet pawl to prevent movement of the body 12 in the one rotational direction, while permitting movement in the opposite rotational direction. The ratchet mechanism 104 further includes means to selectively reverse the operation of the engagement member 108 so that the torque applied by the wrench 10 may also be used to drive an already torqued nut, screw or the like for loosening it.

The engagement member 108 is slidably disposed in an enlarged, upwardly opening recess 112 in the head end portion 26 of the lever arm 24, and is maintained therein by a plate 114 attached to an upward side 116 of the head end portion. The plate 114 has a pair of laterally extending slots 118 with a fastener 120 extending through each slot to retain and adjustably fix the plate to the head end portion 26 of the lever arm 24. The plate 114 is allowed selected lateral movement between a leftmost position and a rightmost position. With the fasteners 120 loosened, the user of the wrench 10 may easily move the plate 114 between its two positions by a thumb-actuated knob 121 fixedly attached to the plate.

Threadedly attached to the plate 114 and extending downwardly toward the engagement member 108 is an off-center pin 122. The pin 122 projects into an upwardly opening hole 124 in the engagement member 108 and is loosely received therein. The pin 122 is movable to one side or the other of an imaginary longitudinal center line extending from the center of the shaft 14 and along the length of the lever arm 24, the center line being indicated in FIG. 3 by reference numeral 126. The pin 122 is moved from one side to the other of the center line by movement of the plate 114 between its leftmost and rightmost positions.

Figure 3:
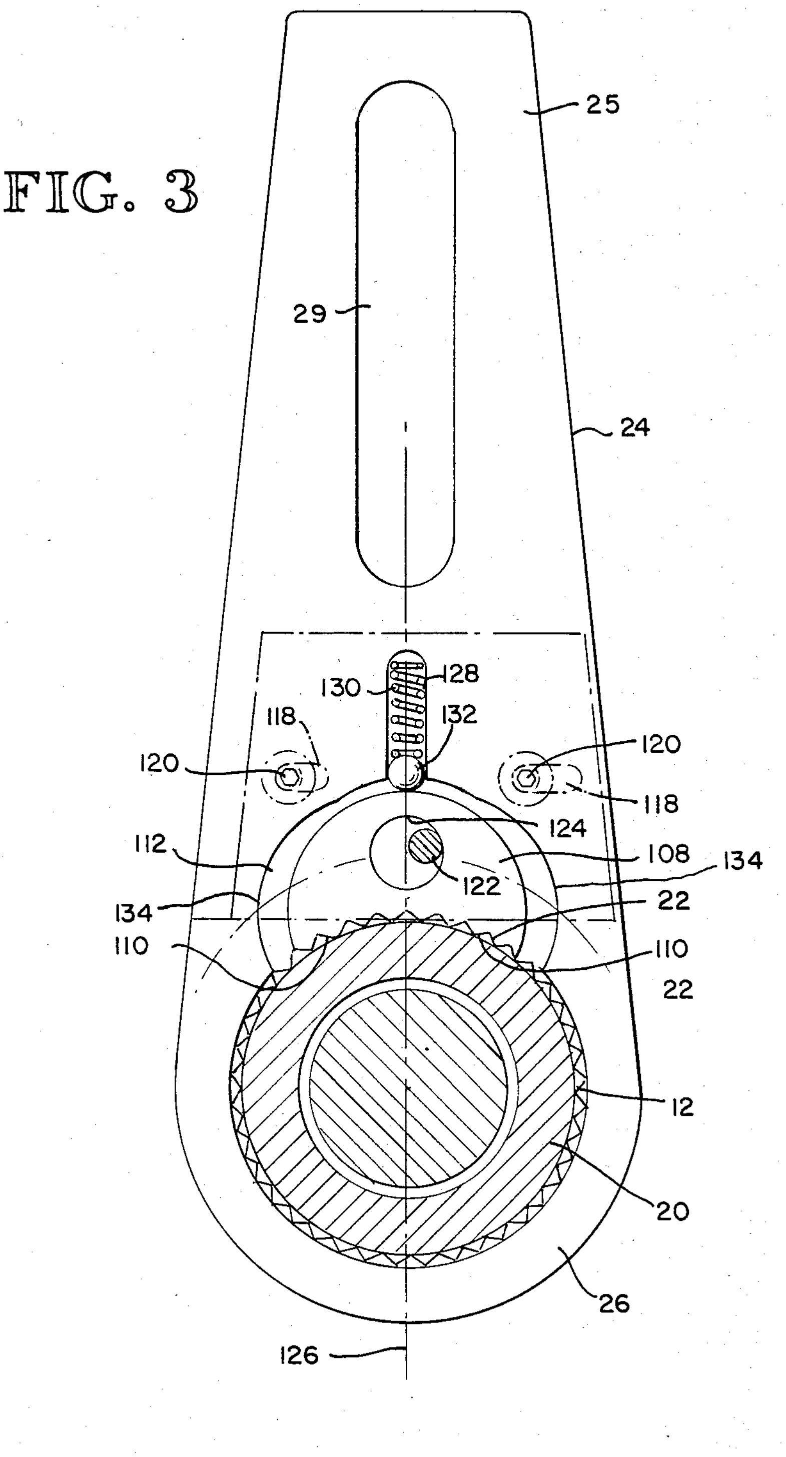
FIG. 3 is an enlarged sectional view taken substantially along the line 3—3 in FIG. 2.

Extending from the recess 112 in the head end portion 26 of the lever arm 24 containing the engagement member 108 is a longitudinally oriented channel 128. The channel 128 is positioned along the center line 126 and contains a coil spring 130 and a ball 132. The ball 132 engages the engagement member 108 under the urging of the coil spring 130 in an eccentric manner relative to the pin 122 to move the toothed face 110 of the engagement member into meshing engagement with the teeth 22 of the reduced end portion 20 of the body 12, as shown in FIG. 3. With the pin 122 in its rightmost position, as shown in FIG. 3 by a solid line representation, counterclockwise rotation of the body 12 is permitted by the pin 122 engaging the right sidewall of the hole 124 and holding the engagement member 108 from moving laterally to the left from the position shown in FIG. 3. As the body 12 turns counterclockwise, the toothed face 110 of the engagement member 108 rides over the teeth 22 of the body in a reciprocating or camming manner, with the spring 130 returning the toothed face into meshing engagement with the teeth of the body each time the body rotates by one tooth spacing.

Figure 4:
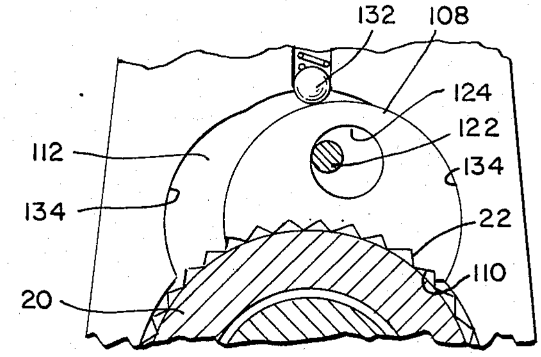
FIG. 4 is a fragmentary view of the ratchet mechanism of FIG. 3, shown preventing clockwise rotation of the wrench body.

With the pin 122 in this rightmost position, clockwise rotation of the body 12 is prevented. Any clockwise rotational force will, through the teeth 22 and the toothed face 110, move the engagement member 108 laterally to the right and into a seated position as shown in FIG. 4. The engagement member 108 will be moved laterally until it is brought into seated engagement against an arcuate wall section 134 of the recess 112 which generally matches the semicircular shape of the engagement member. The hole 124 in the engagement member 108 is sized so that the pin 122 will not impede the lateral movement of the engagement member into its aforedescribed seated position. With the engagement member 108 in its seated position against the arcuate wall section 134, further clockwise rotational force will wedge the engagement member between the body 12 and the wall section 134, and force the toothed face 110 tightly against the teeth 22, thereby preventing any continued clockwise rotation of the body. In like fashion, the ratchet mechanism 104 works in reverse when the plate 114 is moved to position the pin 122 in its leftmost position, as shown in FIG. 3 by a broken line representation.

It will be appreciated that, although a specific embodiment of the invention has been described herein for purposes of illustration, various modifications may be made without departing from the spirit and scope of the invention. Accordingly, the invention is not limited except as by the appended claims.

I claim:

1. A fluid-powered torque wrench connectible to external fluid lines, comprising:

an outer elongated cylindrical body having ports for introducing pressurized fluid therein;

an output shaft with exterior helical splines rotatably supported within said body and having a drive end for detachably securing a socket or other tool thereto for engaging and driving a nut, screw, or the like by rotation of said shaft;

a linear-to-rotary transmission means disposed within said body and operable to provide relative rotational movement between said shaft and said body, said transmission means including a piston sleeve with exterior and interior helical splines and having a piston head for application of fluid pressure to a first side of said head to produce linear movement of said piston sleeve in a first direction, and for application of fluid pressure to an opposite second side of said head to produce linear movement of said piston sleeve in an opposite second direction, and further including spline means substantially stationary relative to said body for meshing with said exterior piston sleeve splines, said interior piston sleeve splines meshing with said exterior shaft splines, whereby linear movement of said piston sleeve in said first direction rotates said shaft to drive said nut, screw or the like and urges said body to rotate in a first rotational direction under the rotational counterforce occurring thereby, and movement of said piston sleeve in said second direction with said shaft held substantially stationary urges said body to rotate in an opposite second rotatonal direction under the rotational counterforce occurring thereby;

an elongated lever arm having a head end portion for rotatably receiving and supporting said body, with said drive end of shaft extending transversely thereto, and a handle end portion for holding said lever arm stationary;

a ratchet operative between said nead end portion and said body for preventing rotational movement of said body relative to said lever arm in said first rotational direction and permitting rotational movement of said body relative to said lever arm in said second rotational direction, said ratchet means converting the relative rotational movement between said shaft and said body resulting from the application of fluid pressure to said first side of said piston into rotation of said shaft relative to said lever arm for driving said nut, screw or the like by preventing rotation of said body in said first rotational direction, and said ratchet means converting the relative rotational movement between said shaft and said body resulting from the application of fluid pressure to said second side of said piston into rotation of said body relative to said lever arm for repositioning said piston within said body for another driving stroke of said piston by permitting rotation of said body in said second rotational direction when said shaft is held substantially stationary; and a stem axially aligned with said body and projecting from the exterior of said body through an end cap thereof and through said piston head, said stem being rotatably received by said end cap and said head, and slidably engaging said head, said stem extending sufficiently into said body to engage said head during the entire travel of said head within said body, and having a pair of interiorly disposed conduits, said one conduit communicating fluid between one of the external fluid lines and said first side of said head, and said other conduit communicating fluid between another of the external fluid lines and said second side of said head, said stem being in fluid-sealed relation with said end cap and said head.

2. A fluid-powered torque wrench, comprising:

an elongated cylindrical body having ports for introducing pressurized fluid therein;

an output shaft rotatably disposed within said body and having end for detachably securing a socket or other tool thereto for engaging and driving a nut, screw, or the like by rotation of said shaft;

linear-to-rotary transmission means disposed within said body and operable to provide relative rotational movement between said shaft and said body, said transmission means including a piston for application of fluid pressure to one or an other side thereof to produce linear movement of said piston within said body, and means for translating linear movement of said piston into relative rotational movement between said shaft and said body, application of fluid to said one side of said piston rotating said shaft to drive said nut, screw or the like, and urging said body to rotate in a first rotational direction under the rotational counterforce, and application of fluid to said other side of said piston with said shaft held substantially stationary urging said body to rotate in an opposite second rotational direction under the rotational counterforce;

an elongated lever arm having a head end portion for rotatably engaging said body with said drive end of said shaft extending transversely thereto, and a handle end portion for holding said lever arm stationary; and control means operative between said head end portion and said body for preventing rotational movement of said body relative to said lever arm in said first rotational direction and permitting rotational movement of said body relative to said lever arm in said second rotational direction, said control means converting the relative rotational movement between said shaft and said body resulting from the application of fluid pressure to said one side of said piston into rotation of said shaft relative to said lever arm for driving said nut, screw or the like by preventing rotation of said body in said first rotational direction, and said control means converting the relative rotational movement between said shaft and said body resulting from the application of fluid pressure to said other side of said piston into rotation of said body relative to said lever arm for repositioning said piston within said body for another driving stroke of said piston by permitting rotation of said body in said second rotational direction when said shaft is held substantially stationary.

3. The torque wrench of claim 2, further including means for selective application of fluid pressure to said one or said other side of said piston.

4. The torque wrench of claim 2, further including connection means for connection of relatively stationary external fluid lines to said body to provide fluid under pressure to the interior of said body while permitting free rotation of said body during operation of the wrench.

5. The torque wrench of claim 4 wherein said connection means includes a stem axially aligned with said body and projecting from the exterior of said body through an end cap thereof and through said piston, said stem being rotatably received by said end cap and said piston, and slidably engaging said piston, said stem extending sufficiently into said body to engage said piston during the entire travel of said piston within said body, and having a pair of interiorly disposed conduits, said one conduit communicating fluid between one of the external fluid lines and said one side of said piston, and said other conduit communicating fluid between another of the external fluid lines and said other side of said piston, said stem being in fluid-sealed relation with said end cap and said piston.

6. The torque wrench of claim 5 wherein said stem has quick-release couplings for detachably securing the external fluid lines.

7. The torque wrench of claim 2 wherein said handle end portion of said lever arm has a longitudinally extending slot sized to receive therein a stationary object for holding said lever arm stationary during operation of the wrench.

8. A fluid-powered torque wrench, comprising:

an elongated cylindrical body having ports for introducing pressurized fluid therein;

an output shaft rotatably disposed within said body and having a drive end for securing a socket or other tool thereto for engaging and driving a nut, screw or the like by rotation of said shaft;

linear-to-rotary transmission means disposed within said body and operable to provide relative rotational movement between said shaft and said body, said transmission means including a piston for application of fluid pressure to one or an other side thereof to produce linear movement of said piston within said body, and means for translating linear movement of said piston into relative rotational movement between said shaft and said body;

an elongated lever arm having a head end portion for rotatably supporting and selectively engaging said body, and a handle end portion for holding said lever arm stationary; and a directional control operative between said lever arm and said body for preventing rotational movement of said body relative to said lever arm in a first rotational direction and permitting rotational movement of said body relative to said lever arm in said second rotational direction.

9. The torque wrench of claim 8, further including means for selectively reversing operation of said directional control to permit rotational movement of said body relative to said lever arm in said first rotational direction, and to prevent rotational movement of said body relative to said lever arm in said second rotational direction, whereby said output shaft can be selectively rotated clockwise or counterclockwise to drive the nut, screw or the like for tightening or loosening.

10. The torque wrench of claim 8 wherein said body has an externally toothed portion extending circumferentially thereabout, said head end portion of said lever arm extending around said toothed portion, and said directional control includes a toothed ratchet pawl attached to said head end portion for selective engagement with said toothed portion of said body to prevent rotational movement of said body relative to said lever arm in said first direction and permit rotational movement of said body relative to said lever arm in said second rotational direction.

11. The torque wrench of claim 9 wherein said body has an externally toothed portion extending circumferentially thereabout, said head end portion of said lever arm extending about said toothed body portion, and said directional control includes a ratched pawl having an arcuate, elongated toothed face resiliently biased toward said body to place said pawl in engagement with said toothed body portion, said pawl having an enlarged opening for loosely receiving therein an off-center member selectively movable to either side of a radial center line, said member reversibly preventing lateral movement of said pawl in one direction to allow rotational movement of said body relative to said lever arm in said second rotational direction, and permitting lateral movement of said pawl in an opposite direction to bring said pawl into wedging engagement between said body and said lever arm to lock said toothed face of said pawl against said toothed body portion and prevent rotational movement of said body relative to said lever arm in said first rotational direction.

* * * * *